United States Patent
Lapp et al.

(10) Patent No.: US 6,197,429 B1
(45) Date of Patent: *Mar. 6, 2001

(54) METHOD FOR MAKING TRANSPARENT GLASS-CERAMICS WITH HIGH TEMPERATURE DIMENSIONAL STABILITY

(75) Inventors: Josef C. Lapp; Chad B. Moore; Linda R. Pinckney, all of Corning, NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/030,866

(22) Filed: Feb. 26, 1998

(51) Int. Cl.$^7$ ........................................... B32B 9/00
(52) U.S. Cl. ................. 428/450; 428/428; 428/446; 428/450; 428/697; 428/702; 501/2; 501/10; 501/69; 501/72; 501/134; 501/136
(58) Field of Search .................... 501/69, 72, 2, 501/10; 428/426, 428, 446, 450, 697, 702; 50/134, 136

(56) References Cited

U.S. PATENT DOCUMENTS

| | | |
|---|---|---|
| 3,681,097 | 8/1972 | Beall et al. . |
| 3,681,102 | 8/1972 | Beall . |
| 4,687,750 | 8/1987 | Pinckney . |
| 4,814,297 * | 3/1989 | Beall et al. ............................. 501/7 |
| 4,824,808 * | 4/1989 | Dumbaugh, Jr. ...................... 501/66 |
| 4,994,415 * | 2/1991 | Imai et al. ............................. 501/66 |
| 5,028,567 | 7/1991 | Gotoh et al. . |
| 5,330,939 | 7/1994 | Marazzi et al. . |
| 5,459,109 * | 10/1995 | Lapp ...................................... 501/66 |
| 5,476,821 | 12/1995 | Beall et al. . |
| 5,491,116 | 2/1996 | Beall et al. . |
| 5,561,089 | 10/1996 | Ishizaki et al. . |
| 5,597,395 * | 1/1997 | Bocko et al. .......................... 65/33.4 |
| 5,658,835 | 8/1997 | Onitani et al. . |
| 5,674,304 * | 10/1997 | Fukada et al. ........................ 65/32.4 |
| 5,882,371 * | 3/1999 | Miyazaki et al. ..................... 65/111 |
| 5,910,459 * | 7/1999 | Beall et al. ............................ 501/8 |
| 5,968,857 | 10/1999 | Pinckney . |

FOREIGN PATENT DOCUMENTS

| | | |
|---|---|---|
| 710 627 A1 | 5/1996 | (EP) . |
| 1221851 | 2/1971 | (GB) . |
| 1544779 | 4/1979 | (GB) . |
| 1-208343 | 8/1989 | (JP) . |
| 8-120900 | 4/1996 | (JP) . |

OTHER PUBLICATIONS

Dumas et al., "Role of Zirconium in Nucleation and Crystallization of a ($SiO_2$, $Al_2O_3$, MgO, ZnO) Glass", *Journal of Materials Science Letters*, 1985, pp (no month) 129–132.

Tkalčec et al., "Crystallization of High–Quartz Solid in Gahnite Glass–Ceramics," *Journal of Non–Crystalline Solids*, 1991, pp 174–182. (No month/date).

Translation of JP 1–208343 (Item 12 above). (No month/date).

* cited by examiner

*Primary Examiner*—Deborah Jones
*Assistant Examiner*—Stephen Stein
(74) *Attorney, Agent, or Firm*—Maurice M. Klee

(57) ABSTRACT

A glass-ceramic material which exhibits extremely low (e.g. less than 100 ppm) shrinkage, when exposed to 900° C. for 6 hours, and methods for making such glass-ceramics. The glass-ceramic is cerammed at a sufficiently high temperature and then cooling in a controlled manner, preferably to below the strain point of the resultant material. Using this technique, glass-ceramic materials were fabricated which exhibited dimensional shrinkage comparable to and in some cases even less than that achieved by fused silica substrates, when exposed to high temperature poly-Si processing temperatures (e.g. 900° C. for 6 hours).

18 Claims, No Drawings

METHOD FOR MAKING TRANSPARENT GLASS-CERAMICS WITH HIGH TEMPERATURE DIMENSIONAL STABILITY

FIELD OF THE INVENTION

The invention relates to transparent, glass-ceramic materials that exhibit high dimensional stability when exposed to high temperatures (e.g. 900° C.), and methods for their making. Such glass-ceramics enable precise photolithography and fabrication of high quality high temperature poly-silicon thin film transistors (TFT's).

BACKGROUND OF THE INVENTION

Liquid crystal displays (LCDs) are typically comprised of two flat glass sheets that encapsulate a thin layer of liquid crystal material. An array of transparent thin film electrodes on the glass modulate the light transmission properties of the liquid crystal material, thereby creating the image. By incorporating an active device such as a diode or thin film transistor (TFT) at each pixel, high contrast and response speed can be achieved to produce high resolution video displays. Such flat panel displays, commonly referred to as active matrix LCDs (AMLCD), have become the predominant technology for high performance displays such as notebook computers and portable televisions.

At present, most AMLCDs utilize amorphous silicon (a-Si) processes which have a maximum process temperature of 450° C. Nevertheless, it has long been recognized that the use of polycrystalline silicon (poly-Si) offers certain advantages over a-Si. Poly-Si has a much higher drive current and electron mobility, thereby allowing reduction of TFT size and at the same time increasing the response speed of the pixels. Poly-Si processing also enables the manufacture of display drive circuitry directly onto the glass substrate (on-board logic). Such integration significantly decreases costs and increases reliability and also allows for smaller packages. By contrast, a-Si requires discrete driver chips that must be attached to the display periphery using integrated circuit packaging techniques such as tape carrier bonding.

Poly-Si is conventionally made by depositing amorphous silicon onto a glass sheet using chemical vapor deposition (CVD) techniques, and subsequently exposing the coated glass to high temperatures for a period of time that is sufficient to crystallize the a-Si to poly-Si. There are many methods for fabricating poly-Si, which can be grouped in two categories: low-temperature poly-Si methods, which utilize processing temperatures up to about 600° C., and high-temperature poly-Si methods, which typically employ temperatures as high as around 900° C.

Many of the low-temperature methods need to employ special techniques to enable crystallization of a-Si to poly-Si. One such technique is laser recrystallization, in which the substrate is held at a temperature of 400° C. and an excimer laser is used to locally melt and recrystallize the Si layer. The main disadvantage of laser recrystallization is the difficulty in achieving good uniformity across the sample. Most of the poly-Si TFTs made by this technique have more than sufficient mobilities for on-board logic, but the fact that only a small area can be melted and recrystallized at any one time leads to uniformity (e.g., stitching) problems. Low temperature poly-Si TFTs can also be made by thermally crystallizing amorphous silicon (maximum temperatures of 600° C.), but in order to make high quality transistors at such low temperatures the films must typically be treated for extended periods of time (e.g. 25 hours or more). In contrast, high temperature processing only requires relatively short process times, and offers the advantage of using other thermal process steps in the manufacture of poly-Si TFT's, such as in situ growing and annealing of the gate oxide, and dopant activation.

The highest quality poly-Si TFTs are fabricated at temperatures of at least 900° C.: such processes enable formation of poly-Si films having extremely high electron mobility (for rapid switching) and excellent TFT uniformity across large areas. This fabrication process typically consists of successive deposition and patterning of thin films using elevated temperature processes which result in the substrate being heated to temperatures in the range of 900° C. Display substrates must not only be capable of surviving such high temperatures without opacifying or warping, but they must also maintain precise dimensional stability. Because the TFT fabrication requires multiple photolithography steps, any irreversible dimensional changes (shrinkage) in the substrate can result in pattern misalignment between successive exposure steps. Permissible substrate shrinkage during display processing depends upon the nature of the circuitry design and the size of the display, and for AMLCDs the shrinkage must amount to no more than a fraction of the smallest feature across the maximum dimension of the display. This can be as small as 5–20 ppm, or a shrinkage of no more than 2.5 to 10 microns over a substrate length of 500 mm.

There are very few materials capable of meeting the thermal stability requirements necessary for high temperature (900° C.) poly-Si processing. One approach has been to use fused silica as the substrate. Fused silica has a sufficiently high strain point of 990°–1000° C. and exhibits very little shrinkage (<50 ppm) when exposed to high temperature poly-Si processes of 900° C. for 6 hours. The thermal expansion of fused silica is significantly lower than that of silicon, however, with a coefficient of thermal expansion (C.T.E.) of $5 \times 10^{-7}$/° C. versus silicon's $37 \times 10^{-7}$/° C. This mismatch can result in a stressed Si film. Furthermore, fused silica substrates are extremely expensive to produce in large size, to the point where using them in large display applications is cost prohibitive.

It would therefore be desirable to develop alternative, less expensive substrate materials which are capable of surviving exposure to the high-temperature poly-Si processes without considerable shrinkage.

SUMMARY OF THE INVENTION

The present invention relates to a transparent, glass-ceramic material which exhibits very high dimensional stability when exposed to temperatures up to 900° C., and methods for making such glass-ceramic materials.

The transparent spinel-based glass-ceramics of the present invention preferably exhibit strain points greater than 850° C., more preferably greater than 875° C., and most preferably greater than 900° C. Applicants have discovered that, where thermal shrinkage during subsequent high temperature (e.g. 900° C.) processing must be minimized to within a few ppm to permit ultra-precise photolithography, a high strain point alone may not be sufficient. We have found that, by incorporating a well-controlled high-temperature cooling cycle into the standard ceram schedule, the suitable minimal levels of shrinkages can be achieved, even at subsequent processing temperatures which occur within 10° C. of the strain point.

One preferred family of transparent glass-ceramic materials for carrying out the present invention are those within the following composition as calculated in weight percent on an oxide basis: 45–75 $SiO_2$, 10–28 $Al_2O_3$, 3–13 ZnO, 0–8 MgO, 0–10 $TiO_2$, 0–10 $ZrO_2$, 0–15 $Cs_2O$, 0–5 BaO, ZnO+MgO in combination being greater than or equal to about 6, and $TiO_2+ZrO_2$ in combination being greater than about 4.

The preferred glass-ceramic materials contain spinel as the predominant crystal phase. By predominant crystal phase, it is meant that this crystal phase is at least about 75 volume percent, more preferably at least 85 percent, and most preferably at least 95 percent of the total crystalline phases present. The glass-ceramics of the present invention are at least about 20 weight percent crystalline phases dispersed within a glassy matrix.

Preferably, these glass ceramics exhibit coefficients of thermal expansion between about $22-42 \times 10^{-7}/°$ C., over the temperature range of 25–300° C., more preferably between about $30-42 \times 10^{-7}/°$ C., and most preferably between about $35-40 \times 10^{-7}/°$ C., providing a close thermal expansion match to silicon. By transparent it is meant that 1.1 mm thick sheets of the glass-ceramics of the present invention exhibit greater than 85 percent transmittance over the visible region (400 nm to 700 nm) of the spectrum. Preferably, for certain applications, it is also desirable that these sheets exhibit some transmittance in the near ultraviolet as well, for example, greater than 50 percent over the region 350–400 nm.

The glass-ceramic substrates made in accordance with the present invention may be employed, for example as substrates for high temperature poly-Si films, in which a silicon (typically amorphous) film is deposited onto the glass-ceramic substrate and then the silicon film is exposed to a temperature greater than 800° C. for a time sufficient to convert the film to high temperature poly-Si. Such processing typically takes place at greater than 850° C., and most typically takes place at about 900° C.

DETAILED DESCRIPTION OF THE INVENTION

Glass-ceramics consist of randomly oriented crystals dispersed within a matrix of residual glass and can be produced through controlled internal nucleation and crystallization of a precursor glass body. Hence, a glass forming batch of the desired composition is melted and that melt is cooled and simultaneously formed into a glass shape of a predetermined configuration utilizing conventional glass forming techniques. Glass forming batches for the inventive spinel crystal-containing glass-ceramic precursor glasses described herein are easily melted and the ensuing melts can be shaped into articles of widely varying geometries. The composition of the precursor glass, and the subsequently formed glass-ceramic, comprises or consists essentially of the following ingredients, expressed in weight percent:

| | | | |
|---|---|---|---|
| $SiO_2$ | 45–75 | BaO | 0–8 |
| $Al_2O_3$ | 10–28 | $Cs_2O$ | 0–15 |
| ZnO | 3–18 | | |
| MgO | 0–8 | | |
| $TiO_2$ | 0–10 | (ZnO + MgO) ≧6% | |
| $ZrO_2$ | 0–10 | ($TiO_2$ + $ZrO_2$) ≧4% | |

More preferably, the composition of the precursor glass, and the subsequently formed glass-ceramic, comprises or consists essentially of the following ingredients, expressed in weight percent:

| | | | |
|---|---|---|---|
| $SiO_2$ | 45–65 | BaO | 0–8 |
| $Al_2O_3$ | 14–28 | $Cs_2O$ | 0–15 |
| ZnO | 4–13 | | |
| MgO | 0–8 | | |
| $TiO_2$ | 0–10 | (ZnO + MgO) ≧8% | |
| $ZrO_2$ | 0–6 | ($TiO_2$ + $ZrO_2$) ≧4% | |

Such precursor glass compositions are further described in U.S. patent application Ser. No. 09/030,863 filed simultaneously herewith (now U.S. Pat. No. 5,968,857), the specification of which is hereby incorporated by reference.

Fining agents, such as $As_2O_5$ or $Sb_2O_3$, may be added to the glass compositions described herein, if needed or desired. In addition, up to 5% of other oxides or fluorides, such as $Rb_2O$, $WO_3$, CaO, SrO, $Nb_2O_5$, $AlF_3$, $B_2O_3$, $Y_2O_3$ or $P_2O_5$ and/or up to 10% of $Bi_2O_3$, $Ta_2O_5$, $Ga_2O_3$, PbO, or $La_2O_3$, can be added if desired. The levels of $K_2O$, $Na_2O$, $Li_2O$, should preferably be limited to no more than 3%, and most preferably are zero, as it is desirable that the glass-ceramics of the present invention be free of mobile alkali ions.

The sum of (ZnO+MgO) is preferably at least 6 weight percent in order to ensure sufficient crystallization of the spinel phase and obtain the desired properties. The sum of ZnO+MgO is preferably less than 18 weight percent in order to maintain transparency and achieve the desired strain point and thermal expansion.

The sum of ($TiO_2+ZrO_2$) is preferably at least 4% to optimize nucleation and transparency. Titania serves as both an extremely effective nucleating agent in these glasses and as an integral component of the spinel crystals. While titania alone, zirconia alone, or mixtures of the two oxides will nucleate the spinel phase, nucleation with zirconia alone is generally not desired from a practical point of view, as $ZrO_2$ significantly raises the liquidus temperature of the glass and results in very steep viscosity curves and increases the potential for stoning. Zirconia also increases the density of the glass-ceramics, which is undesirable for most applications. Moreover, zirconia is less efficient than titania in nucleating spinel in these glasses. If not well nucleated, glasses in this composition range tend to produce β-quartz solid solution and Mg-petalite instead of or in addition to spinel, leading to undesirable crystal growth and subsequent haziness or opacity in the glass-ceramic, as well as cracking in the most severe cases. The more magnesia in a composition, the higher the level of titania required to efficiently nucleate the spinel phase. While 5% $TiO_2$ is sufficient in Mg-free spinel compositions, a minimum of 7.5% $TiO_2$ generally is required in compositions with more than about 2% MgO by weight, providing $ZrO_2$ is absent.

Glass-ceramics typically have strain point temperatures significantly higher than those of their precursor glasses because the crystal phases take up many of the fluxing agents in the glass, leaving the residual glass with fewer fluxes—therefore "harder"—than the precursor glass. The glass-ceramics described herein are designed to have a residual glass whose composition is high in silica content and also theoretically very similar structurally to silica, thereby providing strain points in excess of 850° C., preferably over 875° C., more preferably over 900° C., and most preferably over 925° C.

For the highest possible strain points, the residual glass (i.e., the portion that is not crystalline) in these glass-ceramics should have a composition as close to that of pure silica as possible, or with as few non-bridging oxygens as possible. For this reason, the preferred glass-ceramics are designed to have molar ratios of $(R_2O+RO)/Al_2O_3$ between about 0.5 and 1.5, more preferably about 0.75 to 1.25 and most preferably about 0.85 to 1.15, where $R_2O$=alkali oxides and RO=alkaline earth oxides+ZnO. These ratios can serve as useful indicators of the overall peraluminousness or peralkalinity of the system, which in turn acts as a reasonable predictor of properties such as strain point. It is believed that, the higher these ratios, the more non-bridging oxygen atoms there will be in the residual glass and thus the lower the strain point of the glass-ceramic. Generally, the more peraluminous compositions yield the highest strain points, but often with sacrifices in glass stability and liquidus/viscosity relationships.

Most preferably, the composition of precursor glass, and ultimately the glass-ceramic, comprises or consists essentially, expressed in terms of weight percent on the oxide basis, of about:

| | | | |
|---|---|---|---|
| $SiO_2$ | 50–64 | BaO | 0–4 |
| $Al_2O_3$ | 16–22 | $Cs_2O$ | 0–5 |
| ZnO | 6–13 | | |
| MgO | 1–5 | | |
| $TiO_2$ | 0–10 | (ZnO + MgO) $\geq$9% | |
| $ZrO_2$ | 0–6 | $(TiO_2 + ZrO_2) \geq$5% | |

Most preferably, the composition of precursor glass, and ultimately the glass-ceramic, comprises or consists essentially, expressed in terms of weight percent on the oxide basis, of about:

| | | | |
|---|---|---|---|
| $SiO_2$ | 55–62 | BaO | 0–3 |
| $Al_2O_3$ | 18–22 | $Cs_2O$ | 0–4 |
| ZnO | 8–11 | | |
| MgO | 2–5 | | |
| $TiO_2$ | 0–10 | (ZnO + MgO) $\geq$9% | |
| $ZrO_2$ | 0–6 | $(TiO_2 + ZrO_2) \geq$5% | |

The invention is further illustrated by the following examples, which are meant to be illustrative, and not in any way limiting, to the claimed invention. Table I records a number of glass compositions, expressed in terms of part by weight on the oxide basis, illustrating the compositional parameters of the present invention. Inasmuch as the sum of the individual constituents totals or very closely approximates 100, for all practical purposes the reported values may be deemed to represent weight percent. The actual batch ingredients may comprise any materials, either oxides or other compounds, which, when melted together with the other batch components, will be converted into the desired oxide in the proper proportions.

The glass-ceramics described in Table I were prepared using standard laboratory procedures. Glass batches were ball milled and melted in platinum crucibles at 1600–1625° C. for 16 hours and cast onto steel plates as 6"×6"×0.5" patties. The glass patties were annealed for one hour at 725–750° C. and subsequently cooled overnight. Coupons were then cut from the glass patties and cerammed using one or more heat treatment schedules, as noted in Table I (H.T.). The glasses of the present invention may be nucleated at 775–800° C. for 0–2 hours and then crystallized for 2–4 hours at temperatures of 850–1050° C. Standard powder X-ray diffraction techniques were used to determine the crystal phase(s) present in the glass-ceramic. In all of the examples cited, the sole crystal phase present is spinel solid solution (s.s.). Also reported in Table I are the mole percent ratios of $(R_2O+RO)/Al_2O_3$, where $R_2O$=alkali oxides and RO=alkaline earth oxides+ZnO. These values are listed under $\Sigma RO/Al_2O_3$.

Table I also lists measurements of several chemical and physical properties determined on the glass-ceramics in accordance with techniques conventional in the glass art. Strain point, expressed in terms of ° C., was determined by beam bending viscometry. The linear coefficient of thermal expansion (CTE) over the temperature range 25–300° C. expressed in terms of $\times 10^{-7}/°$ C., was measured using dilatometry. Density is listed, for several of the examples, in grams/cc. Liquidus temperature, in ° C., was measured over 24 hours using the gradient boat technique.

Also reported in Table I are liquidus related data, including liquidus viscosity, as well as the temperature at which the glasses exhibit a viscosity of 300 poise, $10^3$ poise, $10^4$ poise, and $10^5$ poise. This viscosity information is relevant because, in a preferred embodiment of the invention, the glass ceramic composition is chosen to result in a glass material which has a relatively large working viscosity range. Working viscosity range, as used in herein, refers to the temperature range over which the glass ceramics exhibit a viscosity of $10^3$–$10^5$ poise. Preferably, this range is at least 200° C. For example, in Example 16, the working viscosity range is 236° C. (1416–1180° C.).

TABLE 1

Glass-Ceramic Compositions and Properties

| Oxide | 1 | 2 | 3 | 4 | 5 | 6 | 7 |
|---|---|---|---|---|---|---|---|
| $SiO_2$ | 57.5 | 61.5 | 60.2 | 58.3 | 58.8 | 59.6 | 58.9 |
| $Al_2O_3$ | 22.5 | 18.4 | 18.4 | 20.2 | 20.4 | 18.4 | 20.4 |
| ZnO | 8.5 | 8.1 | 10.6 | 8.4 | 6.8 | 8.6 | 7.7 |
| MgO | 4.2 | 4.0 | 2.8 | 4.2 | 5.0 | 4.3 | 4.6 |
| $Cs_2O$ | — | — | — | — | — | — | — |
| BaO | — | — | — | — | — | — | — |
| $TiO_2$ | 7.3 | 3.0 | 3.0 | 3.0 | 3.0 | 3.0 | 3.2 |
| $ZrO_2$ | — | 5.0 | 5.0 | 5.0 | 5.0 | 5.0 | 5.3 |
| $NH_4NO_3$ | 1.0 | 1.0 | 1.0 | — | — | — | 1.0 |
| $As_2O_3$ | 0.5 | 0.5 | 0.5 | — | — | — | 0.5 |
| CaO | — | — | — | — | — | — | — |
| $\Sigma RO/Al_2O_3$ | 0.95 | 1.11 | 1.11 | 1.05 | 1.05 | 1.18 | 1.05 |
| H.T. | 800/1 900/2 | 800/1 900/2 | 800/1 875/2 | 800/1, 900/2 | 800/1, 900/2 | 800/1, 900/2 | 800/1, 900/2 |

TABLE 1-continued

Glass-Ceramic Compositions and Properties

| CTE($10^{-7}$/° C.) | 39.4 | 35.3 | 34.9 | 37.7 | 37.1 | 35.1 | 37.5 |
|---|---|---|---|---|---|---|---|
| Strain Point | 946 | 937 | 935 | 946 | 948 | 930 | 940 |
| Density | | | | 2.76 | | 2.72 | 2.76 |
| Liq. Temp. | | | | 1475 | 1495 | 1500 | |
| Liq. Visc. | | | | 350 | | | |
| T @ 300 poise | | | | 1490 | | | |
| T @ $10^3$ poise | | | | 1393 | | | |
| T @ $10^4$ poise | | | | 1257 | | | |
| T @ $10^5$ poise | | | | 1162 | | | |

| Oxide | 8 | 9 | 10 | 11 | 12 | 13 |
|---|---|---|---|---|---|---|
| $SiO_2$ | 57.4 | 59.0 | 57.3 | 57.4 | 58.8 | 63.0 |
| $Al_2O_3$ | 18.5 | 19.1 | 18.5 | 17.7 | 20.0 | 17.8 |
| ZnO | 13.0 | 9.0 | 11.6 | 10.1 | 6.7 | 5.7 |
| MgO | — | 2.5 | 2.4 | — | 4.9 | 4.2 |
| $Cs_2O$ | — | — | — | — | | |
| BaO | 3.1 | 2.1 | 2.0 | 3.2 | 1.6 | 1.3 |
| $TiO_2$ | 5.0 | 5.1 | 5.0 | 5.1 | 5.0 | 5.0 |
| $ZrO_2$ | 3.0 | 3.1 | 3.0 | 3.1 | 3.0 | 3.0 |
| $NH_4NO_3$ | — | — | — | — | | |
| $As_2O_3$ | — | — | — | — | 0.5 | 0.5 |
| $La_2O_3$ | — | — | — | 3.4 | — | — |
| $\Sigma RO/Al_2O_3$ | 1.0 | 1.0 | 1.2 | 1.0 | — | — |
| H.T. | 800/1, 900/2 | 800/1, 900/2 | 800/1, 900/2 | 800/1, 900/2 | 800/1, 1000/2 | 800/1, 1000/2 |
| CTE($10^{-7}$/° C.) | 37.1 | 37.6 | 38.4 | 37.3 | 36.8 | 33.7 |
| Strain Point | 933 | 913 | 922 | 909 | 899 | 908 |
| Density | | 2.76 | | | 2.74 | 2.67 |
| Liq. Temp/° C. | | 1425 | | | 1360 | 1460 |
| Liq. Visc. | | 950 | | | | |
| T @ 300 poise | 1510 | 1520 | 1485 | 1530 | | |
| T @ $10^3$ poise | 1400 | 1416 | 1385 | 1425 | | |
| T @ $10^4$ poise | 1260 | 1275 | 1245 | 1280 | | |
| T @ $10^5$ poise | 1160 | 1180 | 1140 | 1170 | | |

The most preferred glass ceramic compositions of the present invention are Examples 4 and 9, with the most preferred currently being Example 9.

The compositions of these glass-ceramics are preferably designed such that the fluxes in the glass (MgO and ZnO) partition into the spinel crystals during the crystallization process, leaving a continuous residual glass, 60–70% by volume, that is very high in silica. As a result, the strain point of the material can increase from about 730° C. in the precursor glass to over 950° C. in the final glass-ceramic. Such strain points approach those of fused silica and vitreous quartz (990°–1000° C.), yet, unlike these latter materials, the glass-ceramics can be manufactured economically.

The preferred heat treatment for these glass-ceramics begins with the common heating steps to promote crystal nucleation and crystal growth. As noted in the previous section, the glass-ceramic compositions are designed such that the fluxes in the precursor glass enter the spinel crystals during the crystallization process, leaving a continuous residual glass, 60–70% by volume, that is very high in silica.

The ceram schedule should be at a sufficiently high temperature and for a long enough period of time to result in adequate partitioning of the fluxes into the crystalline phase. The ceram schedule preferably has a peak temperature greater than 900° C., more preferably greater than 950° C., and most preferably greater than 975° C. In addition, these materials should preferably be cooled from about the peak ceram temperature to a temperature which is below the strain point at a rate less than or equal to 0.5° C./min. More preferably, those materials should be cooled at this slow cooling rate (less than or equal to 0.5° C./min.) to a temperature which is at least 15 degrees below the strain point of the resultant glass-ceramic material, and most preferably to a temperature which is at least 25° C. below the strain point. We have found that, by cooling in such a controlled manner, preferably from about the peak crystal growth temperature to a temperature below the strain point of the glass-ceramic material, the thermal shrinkage which would otherwise be experienced by these materials when exposed to temperatures of about 900° C. can be greatly minimized. Employing such a step, moreover, does not necessarily result in an added expense, as such a ceram schedule and controlled cooling schedule can be incorporated into the manufacturing process to be sequential with one another.

Compaction experiments have demonstrated that a spinel-based glass-ceramic, when given an appropriate thermal history can be made to duplicate the minimal shrinkage behavior of fused silica in a simulated high temperature (900° C. for 6 hours) poly-Si process.

The invention is further illustrated by the following examples which are for illustrative purposes only, and are not in any way intended to limit the scope of the invention as defined by the claims.

EXAMPLES

Several glass-ceramic samples, all of which had a starting glass composition equivalent to Example 9 in Table I, were exposed to various ceram and cooling schedules (which are set forth in greater detail below in Table II) sufficient to convert them into glass-ceramic materials.

The following experimental procedure (which simulates a high temperature poly-Si processing step) was then used to measure compaction of the resultant glass-ceramic after exposure to 900° C. for six hours. This technique, which is known as the Comparative Length Technique for Determining Shrinkage, is as follows:

Begin with a polished glass-ceramic sample, 3"×3" or 4"×4" square and 1 mm thick.

Scribe two groups of 5 comparison lines on sample 3–4 inches apart (baseline length).

Scribe and break sample, one half to be heat-treated and the other kept as a standard.

Place samples on silica setter plates

Heat furnace to 750° C. at furnace rate.

Heat furnace 750° to 900° C. at about 10° C. per minute.

Hold for 6 hrs.

Cool from 900° to 500° C. at about 10° C. per minute.

Remove samples

Compare, via optical microscopy, the offset of the comparison lines between the heat treated sample and standard.

Calculate shrinkage (offset/baseline)

The amount of shrinkage in ppm for the glass-ceramic samples having identical compositions but different ceram treatment and/or cooling rates is given below in Table II. Measured strain point temperatures for each of the samples were identical, at about 913° C. The shrinkage of fused silica, our benchmark, is included.

TABLE II

| Nucl. | Growth | Cooling | Shrinkage 900° C./6 hrs. |
|---|---|---|---|
| A) 800° C./1 hr. | 950° C./2 hrs. | 25° C./min. | 130 |
| B) 800° C./2 hrs. | 1000° C./4 hrs. | 25° C./min. | 158 |
| C) 800° C./1 hr. | 950° C./2 hrs. | 950 to 920° C. @ 0.5 C/min. 920 to 910° C. @ 0.1 C/min. 910 to 890° C. @ 0.15 C/min. 890 to 700° C. @ 2 C/min. 700 to RT @ 10 C/min. | 44 |
| D) 800° C./2 hrs. | 1000° C./4 hrs. | 1000 to 950° C. @ 0.5 C/min. 950 to 900° C. @ .1 C/min. 900 to 875° C. @ 0.2 C/min. 875 to 700° C. @ 2 C/min. 700 to RT @ 10 C/min. | 5 |
| fused silica | | | 35 |

Examples A and B were given a nucleation and crystal growth heat treatment, after which the sample was cooled by turning off the furnace and opening the door to the furnace. This resulted in an initial cooling from 1000° C. to about 875° C. in about 5 minutes (about 25° C./min), although a somewhat slower cooling rate took place thereafter. This resulted in a glass-ceramic having unacceptable shrinkage (130 ppm) when thereafter it was exposed to temperatures of 900° C. for a period of 6 hours.

In comparison, Example B illustrates that this problem could not be solved by merely extending the ceram schedule.

However, when subjected to a controlled cooling schedule as set forth in Examples C and D, the glass-ceramic exhibited extremely improved shrinkage levels when exposed to temperatures as high as 900° C. for 6 hours.

Example D exhibited extremely low shrinkages that were comparable or lower than shrinkages obtainable using fused silica substrates. Applicants believe that this is the first time a glass-ceramic material has been able to achieve such low shrinkage levels when exposed to such high temperature processing steps. One particularly surprising finding is the low shrinkage obtainable at 900° C. even though the strain point of the glass-ceramic was only about 913° C. The shrinkage in these materials is comparable to that obtained in fused silica, even though fused silica has a strain point almost 80° C. higher (990°–1000° C.).

The glass-ceramics of the present invention are particularly useful for substrates in high temperature poly-Si TFT display applications because they exhibit very low shrinkage when exposed to temperatures necessary to form high-temperature polysilicon, and yet are relatively very inexpensive to manufacture. In addition to substrates for TFT liquid crystal displays, these refractory glass-ceramics could be useful in a wide variety of applications ranging from substrates for, polysilicon solar cells to components for optical devices.

Although the invention has been described in detail for the purpose of illustration, it is understood that such detail is solely for that purpose and variations can be made therein by those skilled in the art without departing from the spirit and scope of the invention which is defined by the following claims.

What is claimed is:

1. A silicate-based glass-ceramic material comprising a silica-based glass phase and a crystal phase, said material having been subject to a ceram schedule comprising a nucleation period, a crystal growth period during which fluxing agents partition into the crystal phase, and a controlled cooling period during which the temperature of the material is reduced at a sufficiently slow rate so that the material exhibits a shrinkage, when exposed to 900° C. for 6 hours, which is less than 100 ppm, said material having a coefficient of thermal expansion from about $22 \times 10^{-7}$/° C. to about $42 \times 10^{-7}$/° C. over the temperature range of 25–300° C.

2. The silicate-based glass-ceramic of claim 1, wherein the material has a strain point of greater than 850° C.

3. The silicate-based glass-ceramic of claim 1, wherein the material has a strain point of greater than 900° C.

4. The silicate-based glass-ceramic of claim 3, wherein said shrinkage is less than 50 ppm.

5. A flat sheet substrate for forming poly silicon films thereon, said sheet comprising the silicate-based glass-ceramic material of claim 1.

6. The substrate of claim 5, wherein the substrate has a strain point of greater than 850° C.

7. The substrate of claim 5, wherein the substrate has a strain point of greater than 900° C.

8. The substrate of claim 7, wherein said shrinkage is less than 50 ppm.

9. An electronic display comprising the substrate of claim 8 and a poly Si film formed on said substrate.

10. The silicate-based glass ceramic material of claim 1, wherein the material has a composition, in terms of weight percent on the oxide basis, which comprises: 45–70 $SiO_2$, 14–28 $Al_2O_3$, 4–13 ZnO, 0–8 MgO, 0–10 $TiO_2$, 0–10 $ZrO_2$, 0–15 $Cs_2O$, 0–5 BaO, ZnO+MgO in combination being greater than or equal to about 8, and $TiO_2+ZrO_2$ in combination being greater than about 4.

11. The substrate of claim 5, further comprising a poly-silicon film thereon.

12. The substrate of claim 11, wherein said poly-silicon film was processed at greater than 850° C.

13. The silicate-based glass ceramic material of claim 1, wherein the material is cooled at a rate of less than 0.5° C./min throughout said controlled cooling period.

14. The silicate-based glass ceramic material of claim 13, wherein the material is cooled to a temperature at least 15° C. below the material's strain point during said controlled cooling period.

15. The silicate-based glass ceramic material of claim 13, wherein the material is cooled to a temperature at least 25° C. below the material's strain point during said controlled cooling period.

16. The silicate-based glass ceramic material of claim 1, wherein the material has a composition, in terms of weight percent on the oxide basis, which comprises: 45–75 $SiO_2$, 10–28 $Al_2O_3$, 3–18 ZnO, 0–8 MgO, 0–10 $TiO_2$, 0–10 $ZrO_2$, 0–15 $Cs_2O$, 0–8 BaO, ZnO+MgO in combination being greater than or equal to 6, and $TiO_2+ZiO_2$ in combination being greater than or equal to 4.

17. The silicate-based glass ceramic material of claim 1 wherein the material is transparent.

18. The substrate of claim 5 wherein the substrate is transparent.

* * * * *